US012425803B2

(12) United States Patent
Leonard et al.

(10) Patent No.: US 12,425,803 B2
(45) **Date of Patent: *Sep. 23, 2025**

(54) PASSIVE LOCATION CHANGE DETECTION SYSTEM FOR MOBILITY NETWORKS

(71) Applicant: AT&T Intellectual Property I, L.P., Atlanta, GA (US)

(72) Inventors: Leslie Leonard, Lynnwood, WA (US); Rajendra Prasad Kodaypak, Sammamish, WA (US); Marc Sather, Kingston, WA (US); Qingmin Hu, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/544,000

(22) Filed: Dec. 7, 2021

(65) Prior Publication Data

US 2022/0095082 A1 Mar. 24, 2022

Related U.S. Application Data

(63) Continuation of application No. 16/437,582, filed on Jun. 11, 2019, now Pat. No. 11,228,863.

(51) Int. Cl.

| | |
|---|---|
| ***H04W 4/029*** | (2018.01) |
| ***G01S 5/00*** | (2006.01) |
| ***H04W 4/02*** | (2018.01) |
| ***H04W 64/00*** | (2009.01) |

(52) U.S. Cl.
CPC ........... *H04W 4/029* (2018.02); *G01S 5/0054* (2013.01); *G01S 5/0063* (2013.01); *H04W 4/025* (2013.01); *H04W 64/00* (2013.01)

(58) Field of Classification Search
CPC ..... H04W 4/029; H04W 4/025; H04W 64/00; G01S 5/0054; G01S 5/0063
See application file for complete search history.

(56) References Cited

U.S. PATENT DOCUMENTS

| | | | | |
|---|---|---|---|---|
| 7,920,875 | B2 * | 4/2011 | Anderson | G01S 5/0036 455/456.3 |
| 8,135,413 | B2 * | 3/2012 | Dupray | H04W 4/02 455/456.1 |
| 10,869,315 | B2 | 12/2020 | Cheng et al. | |
| 11,228,863 | B2 * | 1/2022 | Leonard | H04W 64/00 |
| 2008/0194269 | A1 | 8/2008 | Abernethy et al. | |
| 2009/0131072 | A1 | 5/2009 | Razdan et al. | |
| 2013/0130710 | A1 * | 5/2013 | Boyer | G01S 5/04 455/456.1 |
| 2014/0011514 | A1 | 1/2014 | Gu et al. | |
| 2015/0201305 | A1 | 7/2015 | Edge | |

(Continued)

*Primary Examiner* — Steven S Kelley

(74) *Attorney, Agent, or Firm* — Guntin & Gust, PLC; Ralph Trementozzi

(57) ABSTRACT

Aspects of the subject disclosure may include, for example, identifying positioning information associated with a wireless communication device, determining a current location of the wireless communication device based on the positioning information, detecting a location change based on the current location of the wireless communication device, and responsive to the detection of the location change, sending a location change notification to a location management entity. Other embodiments are disclosed.

20 Claims, 12 Drawing Sheets

Communication System 200

(56) References Cited

U.S. PATENT DOCUMENTS

| | | | |
|---|---|---|---|
| 2018/0098195 | A1* | 4/2018 | Frydman ............... H04W 4/023 |
| 2019/0182665 | A1 | 6/2019 | Edge |
| 2019/0274130 | A1 | 9/2019 | Cheng et al. |
| 2019/0306826 | A1* | 10/2019 | Do ...................... H04W 64/003 |
| 2020/0329340 | A1* | 10/2020 | Rahman ............... H04B 17/382 |
| 2020/0367022 | A1 | 11/2020 | Tenny et al. |
| 2020/0389759 | A1 | 12/2020 | Wang et al. |
| 2020/0396564 | A1 | 12/2020 | Leonard et al. |

* cited by examiner

900

1200

PASSIVE LOCATION CHANGE DETECTION SYSTEM FOR MOBILITY NETWORKS

CROSS REFERENCE TO RELATED APPLICATIONS

This application is a continuation of U.S. patent application Ser. No. 16/437,582 filed Jun. 11, 2019. The contents of each of the foregoing are hereby incorporated by reference into this application as if set forth herein in full.

FILED OF THE DISCLOSURE

The subject disclosure relates to a passive location change detection system for mobility networks

BACKGROUND

In a mobility network such as a cellular communication network or other type of wireless wide area network (WWAN), location services may be implemented in order to make information available regarding the locations of wireless communication devices in the network. The availability of such information may enable the provision of various types of location-based services. Device location determinations may be performed based on information/parameters obtained via radio access network (RAN)-side positioning procedures.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for implementing passive location change detection in communication systems that support location services. Other embodiments are described in the subject disclosure. One or more aspects of the subject disclosure include conducting location change detection within a radio access network (RAN) rather than in its associated core network. One or more aspects of the subject disclosure include sending location change notifications to inform entities, which can include functions and/or devices, on the core network side of location changes detected on the RAN side. One or more aspects of the subject disclosure include directing such location change notifications to appropriate location services entities in order to fulfill requests received from associated location services clients.

Figure 1:
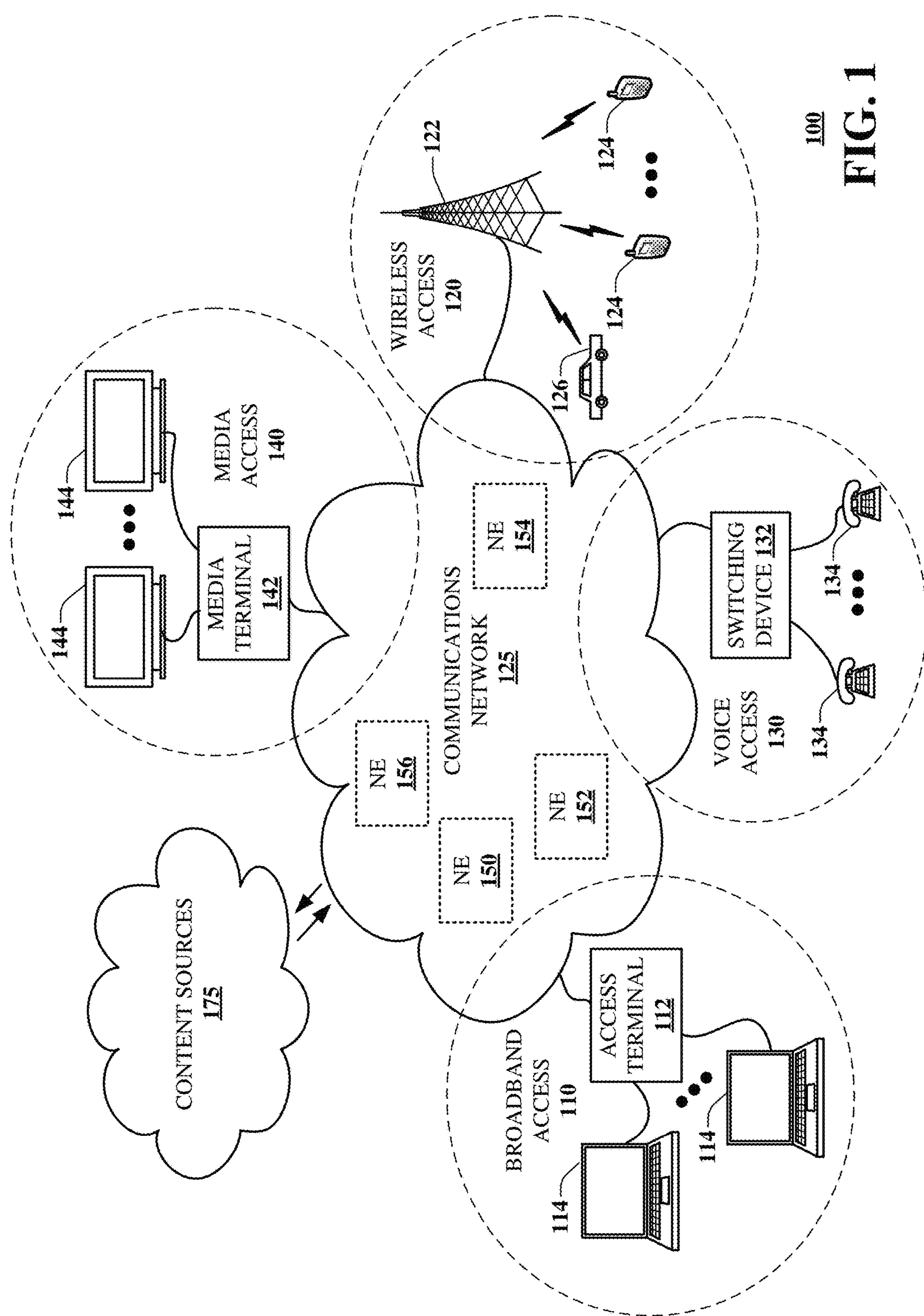
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate in whole or in part conducting location change detection within a radio access network rather than in its associated core network, sending location change notifications to inform entities on the core network side of location changes detected on the RAN side, and/or directing such location change notifications to appropriate location services entities in order to fulfill requests received from associated location services clients. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS)

modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2:
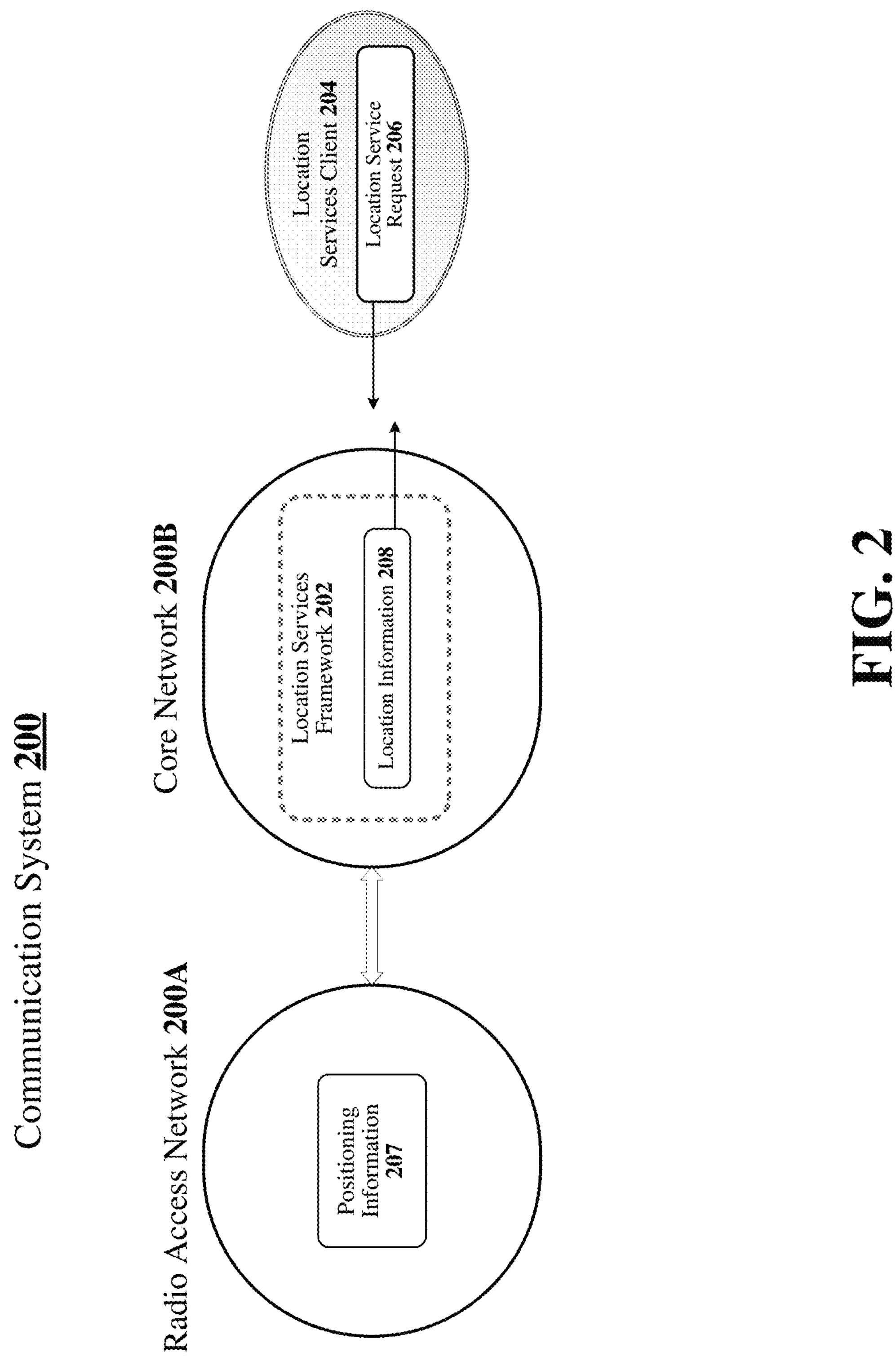
FIG. 2 is a block diagram illustrating an example, non-limiting embodiment of a first communication system in accordance with various aspects described herein.

FIG. 2 is a block diagram illustrating an example, non-limiting embodiment of an implementation of location services in a communication system 200 according with various aspects described herein. Communication system 200 comprises a radio access network 200A and a core network 200B. Wireless communication devices within radio access network 200A may wirelessly communicate with nodes of radio access network 200A in accordance with a set of wireless access technologies, standards, and/or protocols. Core network 200B may provide connectivity to one or more packet data networks (PDNs), such as the Internet. Via radio access network 200A and core network 200B, wireless communication devices in radio access network 200A may be able to access such PDNs. The wireless communication devices can be various types of devices, including mobile phones, Internet of Things (IoT) devices, vehicles, laptop computers, Personal Digital Assistants (PDAs), tablets, user wearable communication devices, or other types of communication devices including mobile devices and devices capable of changing location.

Communication system 200 may be configured to support location services, via which information regarding the locations of wireless communication devices in radio access network 200A may generally be made available to interested entities. The availability of such information may enable the provision of various types of location-based services, such as, for example, public safety services, location-sensitive charging services, person/asset tracking services, traffic monitoring services, enhanced call routing services, and location-based information services. The embodiments are not limited to these examples.

In core network 200B, support for location services may be provided by a location services framework 202. Location services framework 202 may generally comprise a set of nodes, functions, and/or entities operative to process/fulfill requests for information regarding the locations of wireless communication devices in radio access network 200A. Requests for such information may be referred to as "location service requests", and the entities that issue them may be referred to as "location services clients".

In the particular example reflected in FIG. 2, a location services client 204 may generally need to account for changes in the location of a given wireless communication device in radio access network 200A. In some embodiments, location services client 204 may correspond to an entity within core network 200B. In other embodiments, as reflected in the example of FIG. 2, location services client 204 may correspond to an entity residing outside of core network 200B. In some such embodiments, the entity to which location services client 204 corresponds may reside outside of communication system 200, while in others, that entity may be external to core network 200B but still within communication system 200. The embodiments are not limited in this context.

In order to maintain awareness of the location of the wireless communication device, location services client 204 may send a location service request 206. In some cases, location service request 206 may constitute a request simply for information regarding the current location of the device of interest. Alternatively, location service request 206 may constitute a standing request for periodic updates regarding the location of the device of interest. In some embodiments, for example, location service request 206 may represent a request to be provided with information regarding the location of the device of interest upon each occurrence of an event, such as a change in that device's location.

In response to location service request 206, location services framework 202 may provide location information 208 that is indicative of the location of the wireless communication device of interest. In some embodiments, location information 208 may indicate the identity of a radio sector in which the wireless communication device is located. In some other embodiments, location information 208 may indicate a media access control (MAC) address, or a specific geo-coded address. The embodiments are not limited to these examples.

The location of the wireless communication device of interest in the example of FIG. 2 may be determined based on positioning information 207 compiled by radio access network 200A. In some embodiments, positioning information 207 may include information generated by radio access network 200A in the course of performance of a positioning procedure for the device of interest. In some embodiments, positioning information 207 may additionally or alternatively include information provided by the device of interest itself. In some embodiments, positioning information 207 may include downlink (DL) positioning measurements, uplink (UL) positioning measurements, or both. In some embodiments, positioning information 207 may additionally or alternatively include position estimate(s) provided by the device of interest. The embodiments are not limited in this context.

Figure 3:
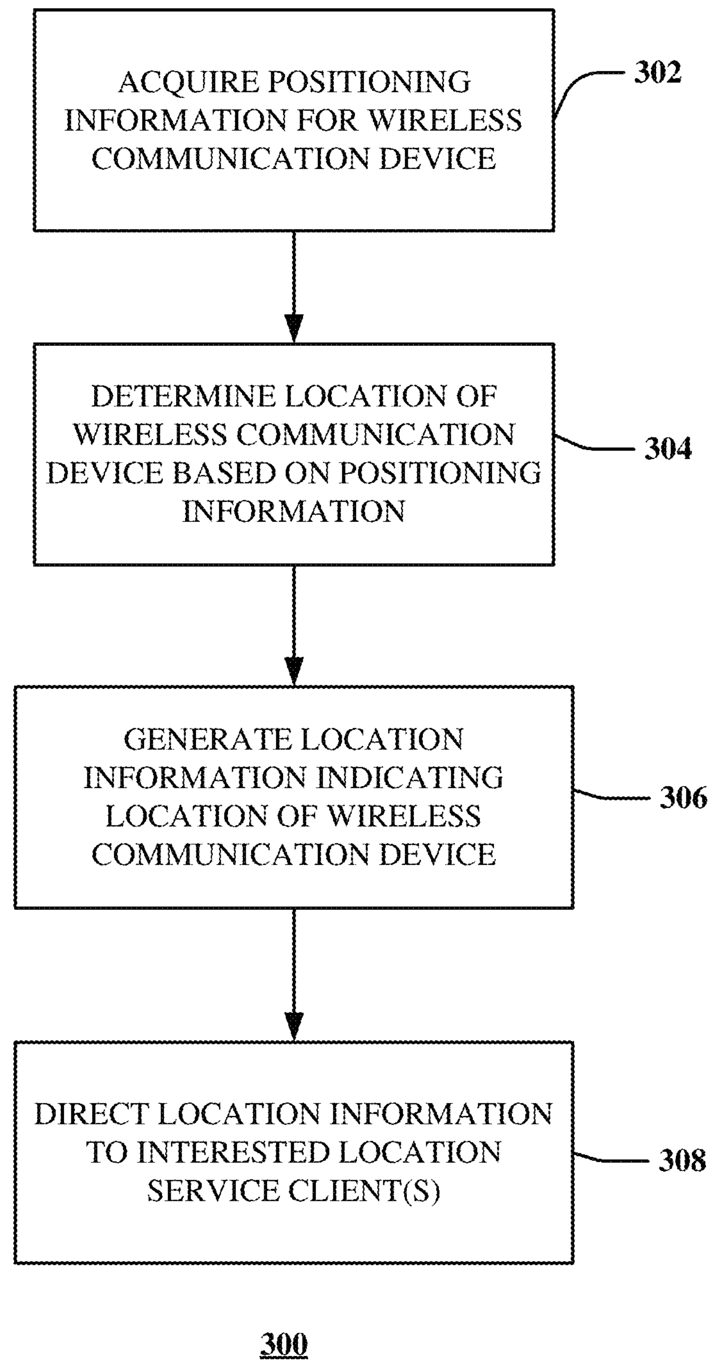
FIG. 3 is a block diagram illustrating an example, non-limiting embodiment of a location information provision procedure in accordance with various aspects described herein.

FIG. 3 depicts an illustrative example of a location information provision procedure 300 according to which location information may be provided to location services clients in communication system 200 of FIG. 2. As shown in FIG. 3, positioning information associated with a wireless communication device may be acquired at 302. For example, a node in radio access network 200A of FIG. 2 may acquire positioning information 207 associated with a wireless communication device in radio access network 200A.

In various embodiments, the positioning information acquired at 302 may include one or more positioning measurements. Such positioning measurements may generally represent measured attributes of wireless signals communicated to and/or from the wireless communication device, the values of which are dependent on the position of the wireless communication device. In some embodiments, the positioning information acquired at 302 may additionally or alternatively include one or more position estimates representing estimates of the geographic position of the wireless communication device. The embodiments are not limited in this context.

At 304, a location of the wireless communication device may be determined based on the positioning information acquired at 302. For example, a location of a wireless communication device in radio access network 200A of FIG. 2 may be determined based on positioning information 207. In various embodiments, the location of the wireless communication device may be determined in the form of a radio sector in which the wireless communication device resides or is currently located. The embodiments are not limited in this context.

At 306, location information may be generated that indicates the location of the wireless communication device, as determined at 304. For example, location information 208 may be generated that indicates the location of a wireless communication device in radio access network 200A of FIG. 2. At 308, the location information may be directed to one or more location service clients that are interested in the location of the wireless communication device. For example, location information 208 may be directed to location service client 204 in FIG. 2. Examples of potential users of location information, such as may correspond to location service clients receiving location information at 308, include public safety entities such as the First Responder Network Authority (FirstNet), law enforcement agencies such as the Federal Bureau of Investigation, internal and external marketing systems, and commercial service providers. In an example embodiment, an organization may use location information provided via location information provision procedure 300 to track the locations of a set of IoT assets. The embodiments are not limited to these examples.

Figure 4:
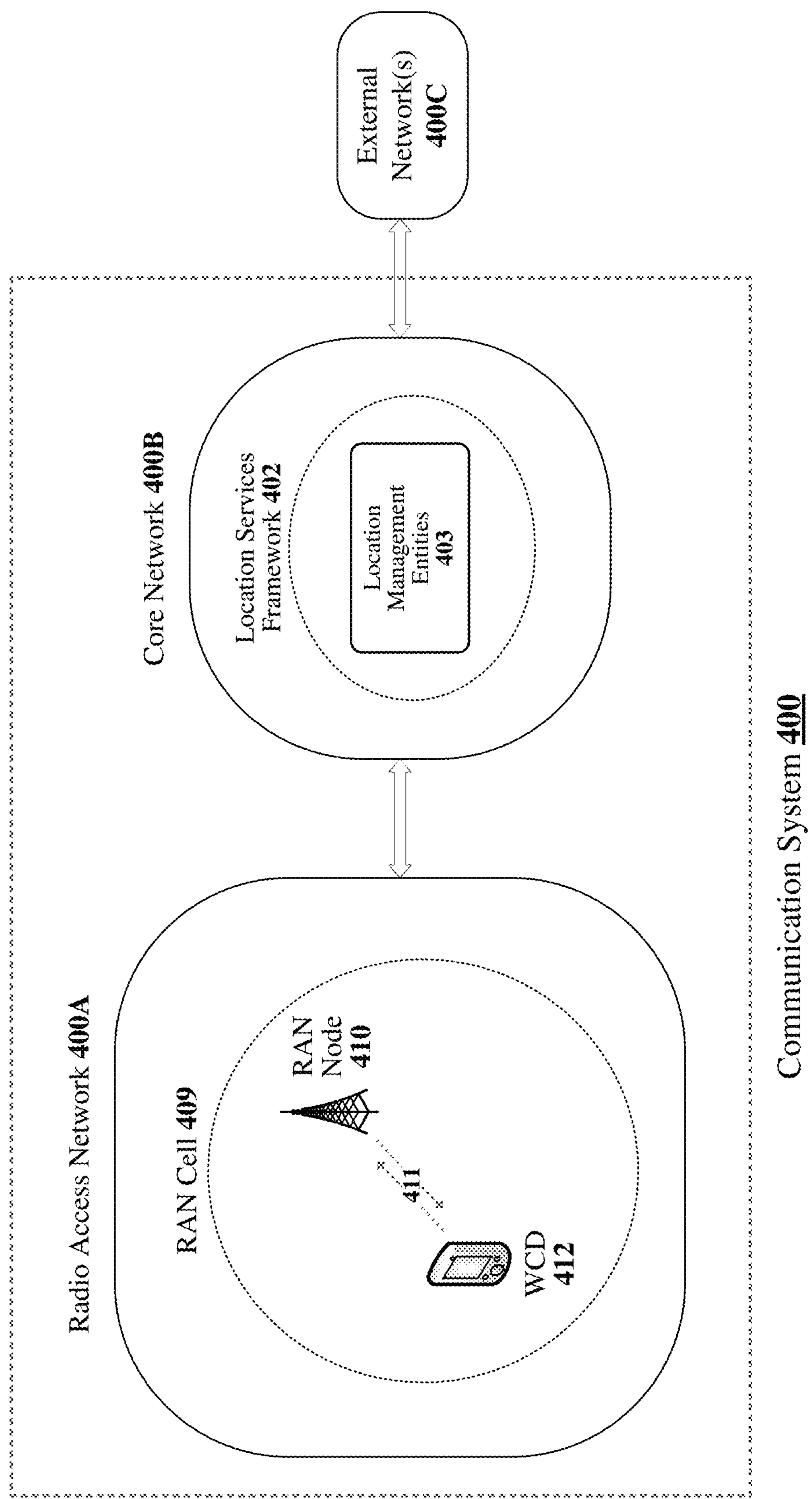
FIG. 4 is a block diagram illustrating an example, non-limiting embodiment of a second communication system in accordance with various aspects described herein.

FIG. 4 is a block diagram illustrating a non-limiting example of a communication system 400 that may implement a passive location change detection system in some embodiments, in accordance with various aspects described herein. Communication system 400 features a radio access network 400A and a core network 400B, which may generally correspond to radio access network 200A and core network 200B of FIG. 2 according to some embodiments. Core network 400B provides connectivity to one or more external networks 400C. Any given external network 400C may generally comprise a packet-switched or circuit-switched network that is external to communication system 400. External networks 400C may include one or more PDNs, such as the Internet.

In the example depicted in FIG. 4, radio access network 400A includes a radio access network (RAN) node 410. RAN node 410 serves a RAN cell 409. A wireless communication device (WCD) 412 within RAN cell 409 may wirelessly communicate with RAN node 410 via a wireless link 411. RAN node 410 may possess connectivity to external network(s) 400C via core network 400B, with which RAN node 410 may communicate either directly or via one or more intermediate nodes or other elements of radio access network 400A. The establishment of wireless link 411 may enable that connectivity to be extended to WCD 412.

According to various embodiments, communication system 400 may represent a 3GPP 5G System. In such embodiments, radio access network 400A may represent an NG-RAN, RAN node 410 may represent an NG-eNB or a gNB, and core network 400B may represent a 5G Core Network. According to some other embodiments, communication system 400 may represent a 3GPP Evolved Packet System. In such embodiments, radio access network 400A may represent an E-UTRAN, RAN node 410 may represent an eNB, and core network 400B may represent an Evolved Packet Core. The embodiments are not limited to these examples.

In core network 400B, support for location services may be provided by a location services framework 402, which may generally correspond to location services framework 202 of FIG. 2 according to various embodiments. Location services framework 402 may generally comprise a set of nodes, functions, and/or entities operative to process/fulfill location service requests associated with wireless communication devices in radio access network 400A, such as WCD 412. Location services framework 402 may include location management entities 403, which may generally be responsible for effecting the delivery of appropriate location information to location service clients in order to inform such clients of the locations of wireless communication devices of interest. Location information that is delivered to location service clients of communication system 400 may be used in some embodiments to support the provision of various types of location-based services. Examples of such location-based services may include, without limitation, any of the examples mentioned above in reference to the provision of location-based services in communication system 200 of FIG. 2.

Communication system 400 may implement a passive location change detection system. According to such a system, rather than (or in addition to) using polling to detect changes in the locations of devices in radio access network 400A, location services framework 402 may receive notification of location changes from radio access network 400A. In an example embodiment, RAN node 410 may identify positioning information associated with WCD 412 and determine a current location of WCD 412 based on the positioning information. Based on the current location of WCD 412, RAN node 410 may determine whether the location of WCD 412 has changed. For example, RAN node 410 may determine whether the location of WCD 412 has changed based on whether the current location of WCD 412 differs from a last known location of WCD 412. Responsive to detection of a location change, RAN node 410 may send a location change notification to a location management entity 403. The location management entity 403 may determine one or more location services entities in location services framework 402 that should be notified of the location change, and may send location change notifications to those location service entities. Such location services entities may then direct location information to interested location services clients in order to provide them with up-to-date information regarding the location of WCD 412. In some embodiments, the one or more location services entities may correspond to location retrieval functions (LRFs). The embodiments are not limited in this context.

Figure 5:
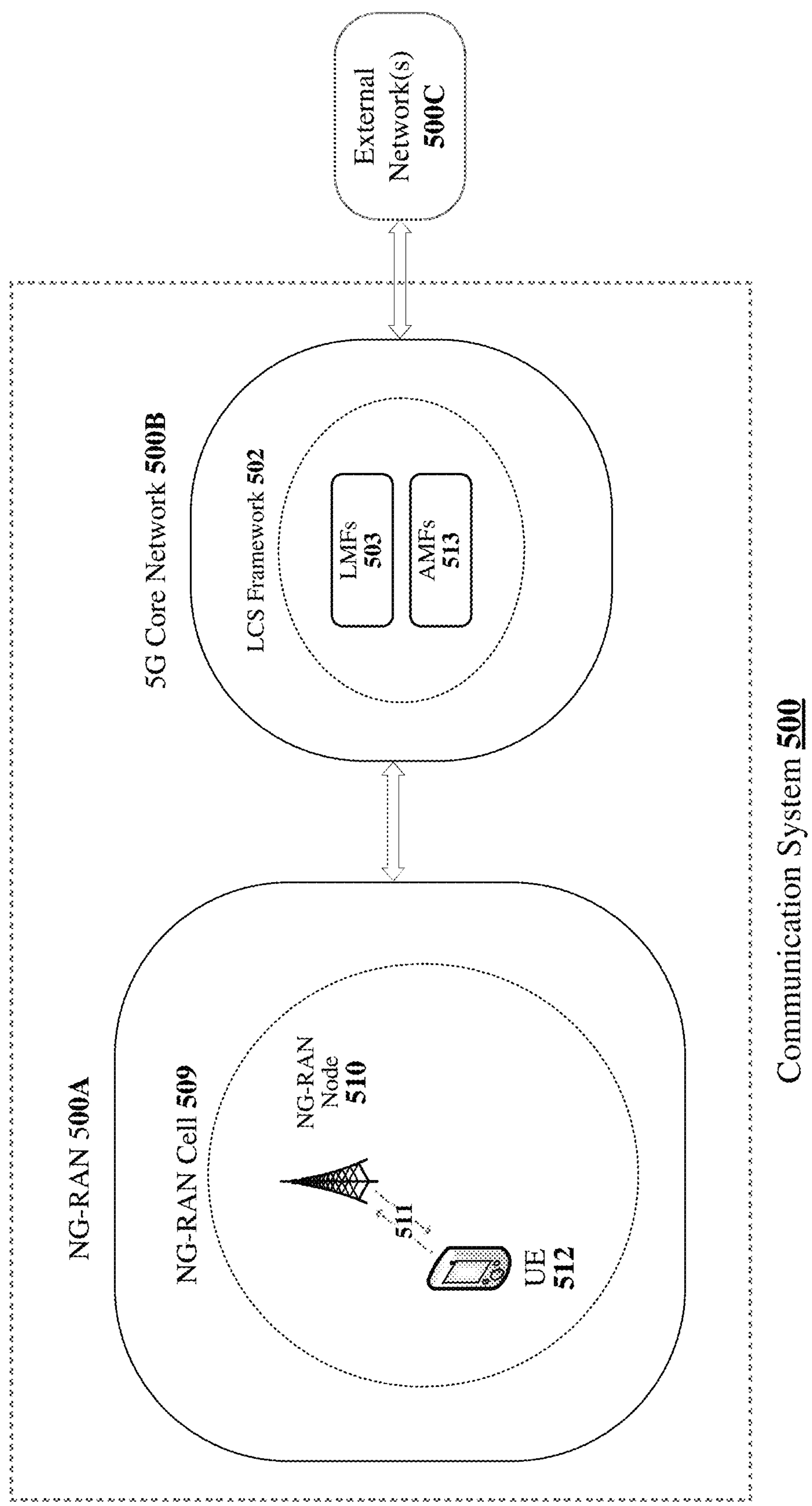
FIG. 5 is a block diagram illustrating an example, non-limiting embodiment of a third communication system in accordance with various aspects described herein.

As noted above, in some embodiments, communication system 400 may be implemented as a 5G system. FIG. 5 is a block diagram illustrating a non-limiting example of such a 5G system according to various embodiments. More particularly, FIG. 5 depicts a communication system 500 that may be representative of a 3GPP 5G system that may implement passive location change detection in accordance with various aspects described herein. Communication system 500 features an NG-RAN 500A and a 5G core network 500B, which may generally constitute 5G implementations of radio access network 400A and core network 400B of FIG. 4, respectively. 5G core network 500B provides connectivity to one or more external networks 500C. Any given external network 500C may generally comprise a packet-switched or circuit-switched network that is external to communication system 500. External networks 500C may include one or more PDNs, such as the Internet.

In the example depicted in FIG. 5, NG-RAN 500A includes an NG-RAN node 510. In some embodiments, NG-RAN node 510 may represent an NG-eNB. In various other embodiments, NG-RAN node 510 may represent a gNB. NG-RAN node 510 serves an NG-RAN cell 509. User equipment (UE) 512 within NG-RAN cell 509 may wirelessly communicate with NG-RAN node 510 via a wireless link 511. In embodiments in which NG-RAN node 510 represents an NG-eNB, wireless link 511 may represent an E-UTRA link. In embodiments in which NG-RAN node 510 represents a gNB, wireless link 511 may represent a 3GPP New Radio (NR) link. NG-RAN node 510 may possess connectivity to external network(s) 500C via 5G core network 500B, with which NG-RAN node 510 may communicate either directly or via one or more intermediate nodes or other elements of NG-RAN 500A. The establishment of wireless link 511 may enable that connectivity to be extended to UE 512.

Communication system 500 may be representative of a 3GPP 5G system that supports 3GPP Location Services (LCS). In 5G core network 500B, LCS support may be provided by an LCS framework 502, which may generally constitute a 5G implementation of location services framework 402 of FIG. 4. LCS framework 502 may generally comprise a set of nodes, functions, and/or entities operative to process/fulfill location service requests associated with UEs in NG-RAN 500A, such as UE 512. LCS framework 502 may utilize location management functions (LMFs) 503. LMFs 503 may generally be responsible for effecting the delivery of appropriate location information to LCS clients in order to inform them of the locations of UEs of interest. LCS framework 502 may utilize access/mobility management functions (AMFs) 513. In the context of LCS, AMFs 513 may generally serve as intermediaries between LMFs 503 and NG-RAN 500A, and between LMFs 503 and LCS entities within LCS framework 502.

Location information that is delivered to LCS clients of communication system 500 may be used in some embodiments to support the provision of various types of location-based services. Examples of such location-based services may include, without limitation, any of the examples mentioned above in reference to the provision of location-based services in communication system 200 of FIG. 2.

Communication system 500 may implement a passive location change detection system. According to such a system, rather than (or in addition to) using polling to detect changes in the locations of UEs in NG-RAN 500A, LCS framework 502 may receive notification of location changes from NG-RAN 500A. In an example embodiment, NG-RAN node 510 may identify positioning information associated with UE 512 and determine a current location of UE 512 based on the positioning information. Based on the current location of UE 512, NG-RAN node 510 may determine whether the location of UE 512 has changed. For example, NG-RAN node 510 may determine whether the location of UE 512 has changed based on whether the current location of UE 512 differs from a last known location of UE 512. Responsive to detection of a location change, NG-RAN node 510 may send a location change notification to an LMF 503. The LMF 503 may determine one or more LCS entities that should be notified of the location change, and may send location change notifications to those LCS entities. Such LCS entities may then direct location information to LCS clients in order to provide them with up-to-date information regarding the location of UE 512. In an example embodiment, the LMF 503 may identify a location retrieval function (LRF) applicable to UE 512, and may send a location change notification to an LCS client associated with the LRF via a Gateway Mobile Location Center (GMLC). The embodiments are not limited to this example.

Figure 6:
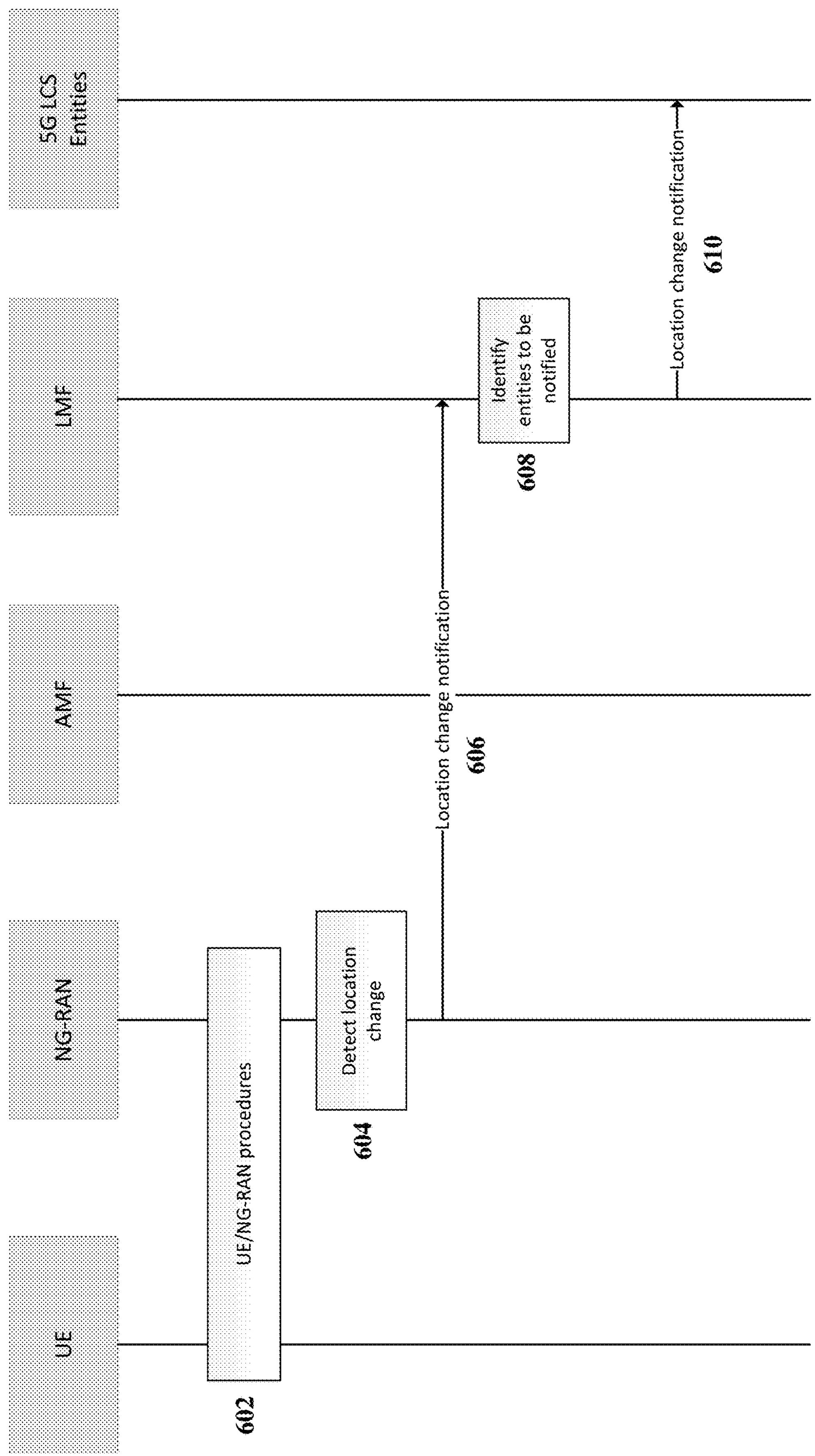
FIG. 6 depicts an illustrative embodiment of an operations flow in accordance with various aspects described herein.

FIG. 6 depicts an illustrative example of an operations flow 600 that may be representative of the implementation of passive location change detection in communication system 500 of FIG. 5 according to some embodiments. The operations flow illustrated in FIG. 6 may begin at 602, where procedures may be instigated with a UE and/or its serving NG-RAN to obtain positioning information associated with the UE. For example, via procedures instigated at 602, a node of NG-RAN 500A of FIG. 5, such as NG-RAN node 510, may obtain positioning information associated with UE 512. At 604, the NG-RAN may detect a location change based on the obtained positioning information. For example, NG-RAN node 510 of FIG. 5 may detect a change in the location of UE 512 based on positioning information obtained at 602.

At 606, a location change notification may be sent to an LMF in order to notify the LMF of the change in the location of the UE. For example, NG-RAN node 510 of FIG. 5 may send a location change notification to an LMF 503 in response to detecting a change in the location of UE 512. Although the location change notification at 606 is depicted as being sent directly to the LMF in FIG. 6, in some embodiments, it may be sent to the LMF via one or more intermediate nodes/entities. For example, in some embodiments, NG-RAN node 510 of FIG. 5 may send a location change notification to an LMF 503 via an AMF 513. At 608, the LMF may identify location service entities that should be notified of the location change detected at 604. At 610, the LMF may send location change notifications to one or more 5G LCS entities identified at 608. The embodiments are not limited in this context.

Figure 7:
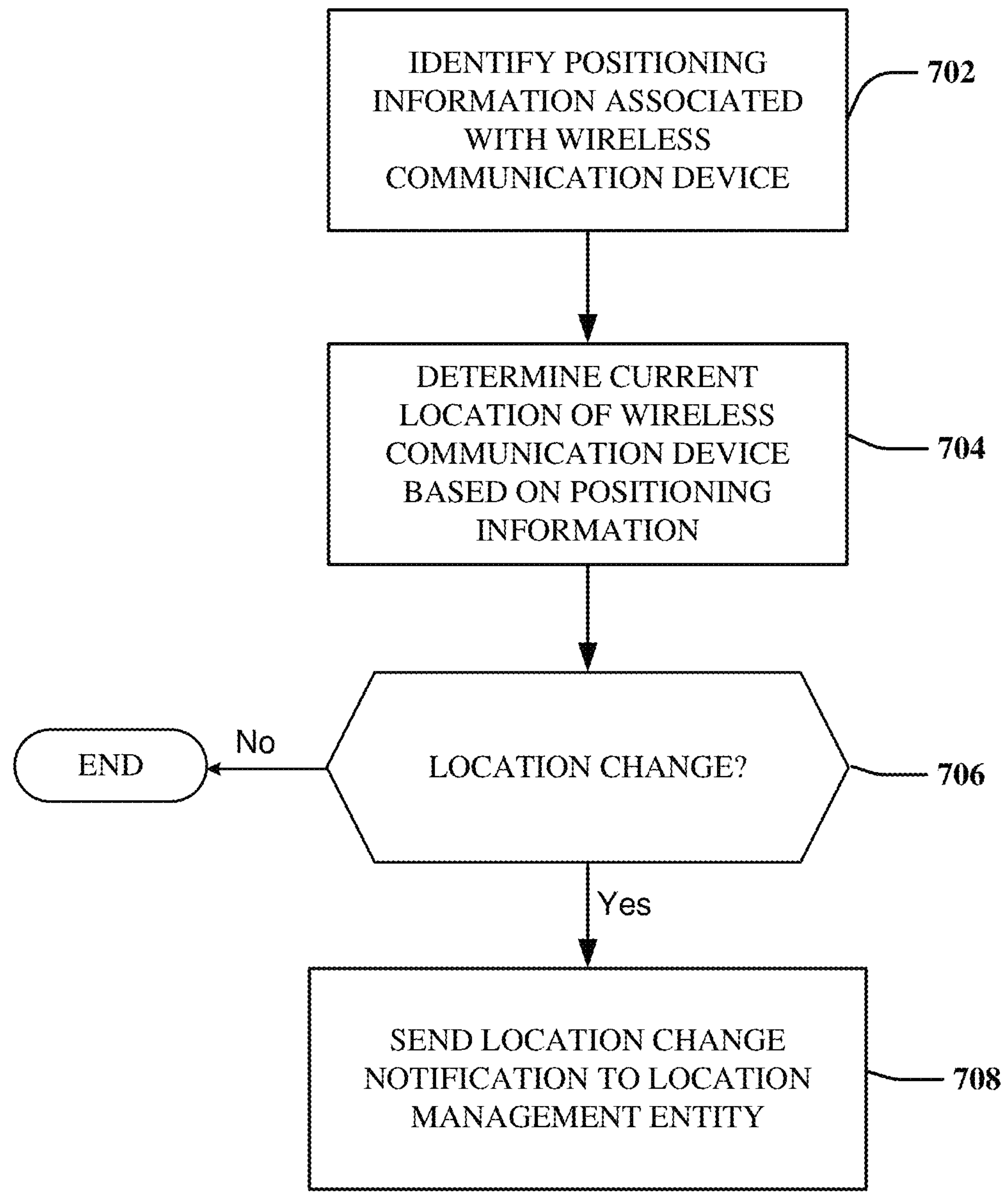
FIG. 7 depicts an illustrative embodiment of a first method in accordance with various aspects described herein.

FIG. 7 depicts an illustrative embodiment of a method 700 in accordance with various aspects described herein. Method 700 may be representative of a method that may be performed by RAN node 410 of FIG. 4 or NG-RAN node 510 of FIG. 5 according to various embodiments. As shown in FIG. 7, positioning information associated with a wireless communication device may be identified at 702. For example, NG-RAN node 510 of FIG. 5 may identify positioning information associated with UE 512. At 704, the current location of the wireless communication device may be identified based on the positioning information. For example, NG-RAN node 510 of FIG. 5 may determine the current location of UE 512 based on positioning information identified at 702. At 706, based on the current location of the wireless communication device, it may be determined whether the location of the wireless communication device has changed. For example, based on the current location of UE 512, NG-RAN node 510 of FIG. 5 may determine whether the location of UE 512 has changed.

If it is determined at 706 that the location of the wireless communication device has not changed, the method may end. If it is determined at 706 that the location of the wireless communication device has changed, flow may pass to 708. At 708, a location change notification may be sent to a location management entity in order to notify the location management entity of the change in the location of the wireless communication device. For example, NG-RAN node 510 of FIG. 5 may send a location change notification to an LMF 503 in order to notify the LMF 503 of the change in the location of UE 512. The embodiments are not limited to these examples.

Figure 8:
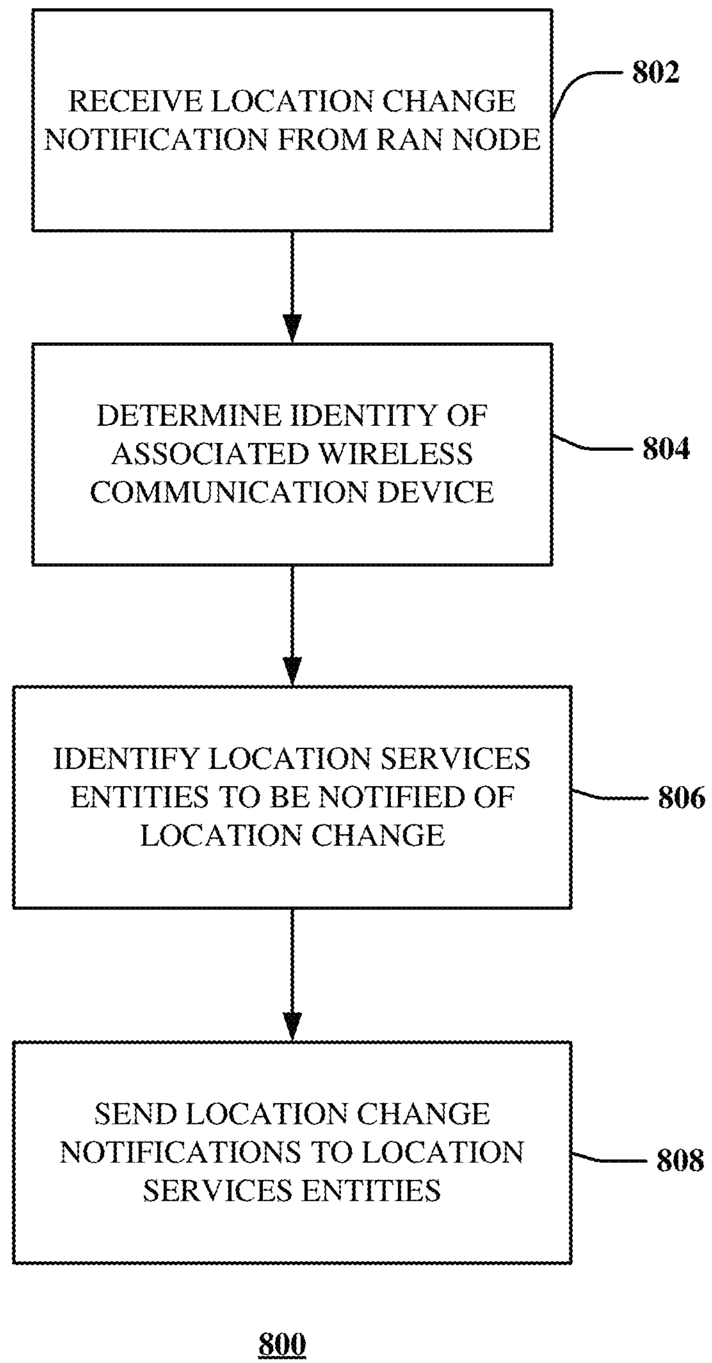
FIG. 8 depicts an illustrative embodiment of a second method in accordance with various aspects described herein

FIG. 8 depicts an illustrative embodiment of a method 800 in accordance with various aspects described herein. Method 800 may be representative of a method that may be performed by a location management entity 403 in FIG. 4 or an LMF 503 in FIG. 5 according to various embodiments.

As shown in FIG. 8, a location change notification may be received from a RAN node at 802. For example, an LMF 503 in FIG. 5 may receive a location change notification from NG-RAN node 510. At 804, an identity of a wireless communication device associated with the location change notification may be determined. For example, an LMF 503 in FIG. 5 may determine that UE 512 is associated with a location change notification received at 802. At 806, one or more location services entities may be identified that are to be notified of the change in the location of the wireless communication device. For example, an LMF 503 in FIG. 5 may identify an LRF to be notified of the change in the location of UE 512. At 808, location change notifications may be sent to the one or more location services entities identified at 806. For example, an LMF 503 in FIG. 5 may send a location change notification to notify an LRF identified at 806 of the change in the location of UE 512. The embodiments are not limited to these examples.

While for purposes of simplicity of explanation, the respective processes are shown and described as a series of blocks in FIGS. 7 and 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 9:
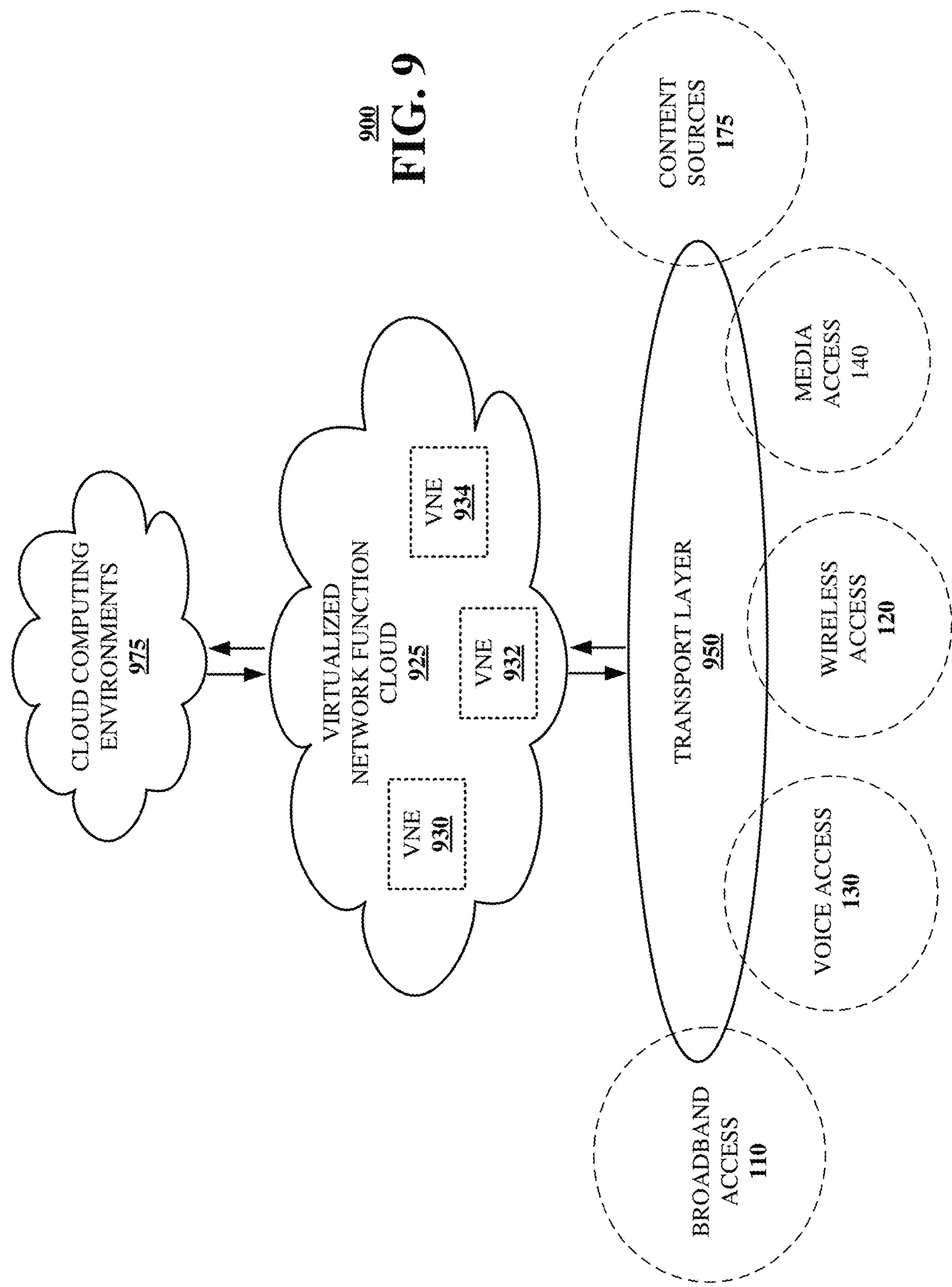
FIG. 9 is a block diagram illustrating an example, non-limiting embodiment of a virtualized communication network in accordance with various aspects described herein.

Referring now to FIG. 9, a block diagram 900 is shown illustrating an example, non-limiting embodiment of a virtualized communication network in accordance with various aspects described herein. In particular a virtualized communication network is presented that can be used in various embodiments to implement some or all of the subsystems and functions of communication network 100 of FIG. 1, communications systems 200, 400, and 500 of FIGS. 2, 4, and 5, location information provision procedure 300 of FIG. 3, operations flow 600 of FIG. 6, and methods 700 and 800 of FIGS. 7 and 8. For example, virtualized communication network 900 can facilitate in whole or in part conducting location change detection within a radio access network rather than in its associated core network, sending location change notifications to inform entities on the core network side of location changes detected on the RAN side, and/or directing such location change notifications to appropriate location services entities in order to fulfill requests received from associated location services clients.

In particular, a cloud networking architecture is shown that leverages cloud technologies and supports rapid innovation and scalability via a transport layer 950, a virtualized network function cloud 925 and/or one or more cloud computing environments 975. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 930, 932, 934, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 930 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 950 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 930, 932 or 934. These network elements can be included in transport layer 950.

The virtualized network function cloud 925 interfaces with the transport layer 950 to provide the VNEs 930, 932, 934, etc. to provide specific NFVs. In particular, the virtualized network function cloud 925 leverages cloud operations, applications, and architectures to support networking workloads. The virtualized network elements 930, 932 and 934 can employ network function software that provides either a one-for-one mapping of traditional network element function or alternately some combination of network functions designed for cloud computing. For example, VNEs 930, 932 and 934 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 930, 932, 934, etc. can be instantiated and managed using an orchestration approach similar to those used in cloud compute services.

The cloud computing environments 975 can interface with the virtualized network function cloud 925 via APIs that expose functional capabilities of the VNEs 930, 932, 934, etc. to provide the flexible and expanded capabilities to the virtualized network function cloud 925. In particular, network workloads may have applications distributed across the virtualized network function cloud 925 and cloud computing environment 975 and in the commercial cloud, or might simply orchestrate workloads supported entirely in NFV infrastructure from these third party locations.

Figure 10:
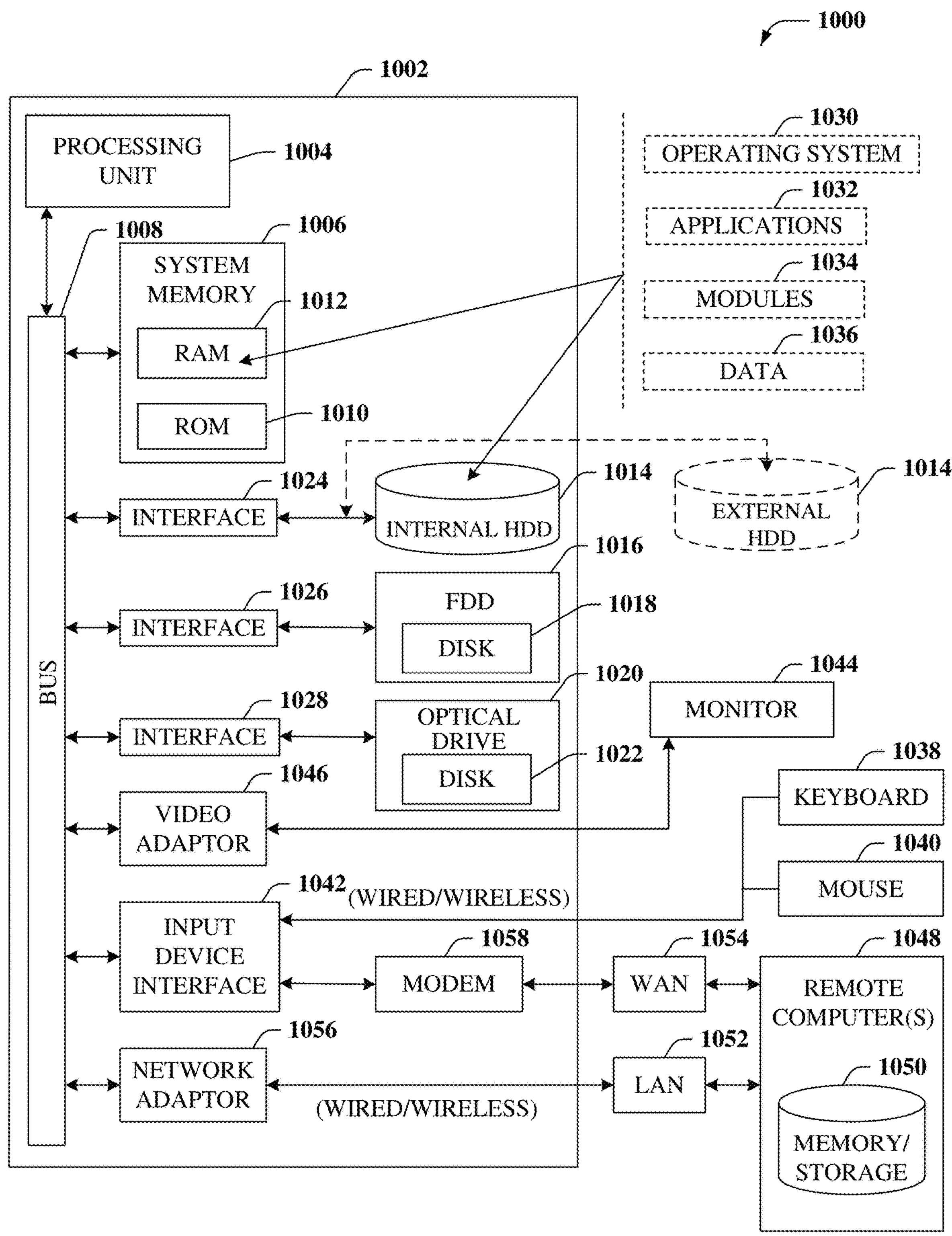
FIG. 10 is a block diagram of an example, non-limiting embodiment of a computing environment in accordance with various aspects described herein.

Turning now to FIG. 10, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 1000 in which the various embodiments of the subject disclosure can be implemented. In particular, computing environment 1000 can be used in the implementation of network elements 150, 152, 154, 156, access terminal 112, base station or access point 122, switching device 132, media terminal 142, and/or VNEs 930, 932, 934, etc. Each of these devices can be implemented via computer-executable instructions that can run on one or more computers, and/or in combination with other program modules and/or as a combination of hardware and software. For example, computing environment 1000 can facilitate in whole or in part conducting location change detection within a radio access network rather than in its associated core network, sending location change notifications to inform entities on the core network side of location changes detected on the RAN side, and/or directing such location change notifications to appropriate location services entities in order to fulfill requests received from associated location services clients.

Generally, program modules comprise routines, programs, components, data structures, etc., that perform particular tasks or implement particular abstract data types. Moreover, those skilled in the art will appreciate that the disclosed methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 10, the example environment can comprise a computer 1002, the computer 1002 comprising a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also comprise a high-speed RAM such as static RAM for caching data.

The computer 1002 further comprises an internal hard disk drive (HDD) 1014 (e.g., EIDE, SATA), which internal HDD 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The HDD 1014, magnetic FDD 1016 and optical disk drive 1020 can be connected to the system bus 1008 by a hard disk drive interface 1024, a magnetic disk drive interface 1026 and an optical drive interface 1028, respectively. The hard disk drive interface 1024 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can comprise a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. It will also be appreciated that in alternative embodiments, a monitor 1044 can also be any display device (e.g., another computer having a display, a smart phone, a tablet computer, etc.) for receiving display information associated with computer 1002 via any communication means, including via the Internet and cloud-based networks. In addition to the monitor 1044, a computer typically comprises other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically comprises many or all of the elements described relative to the computer 1002, although, for purposes of brevity, only a remote memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the LAN 1052 through a wired and/or wireless communication network interface or adapter 1056. The adapter 1056 can facilitate wired or wireless communication to the LAN 1052, which can also comprise a wireless AP disposed thereon for communicating with the adapter 1056.

When used in a WAN networking environment, the computer 1002 can comprise a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 11:
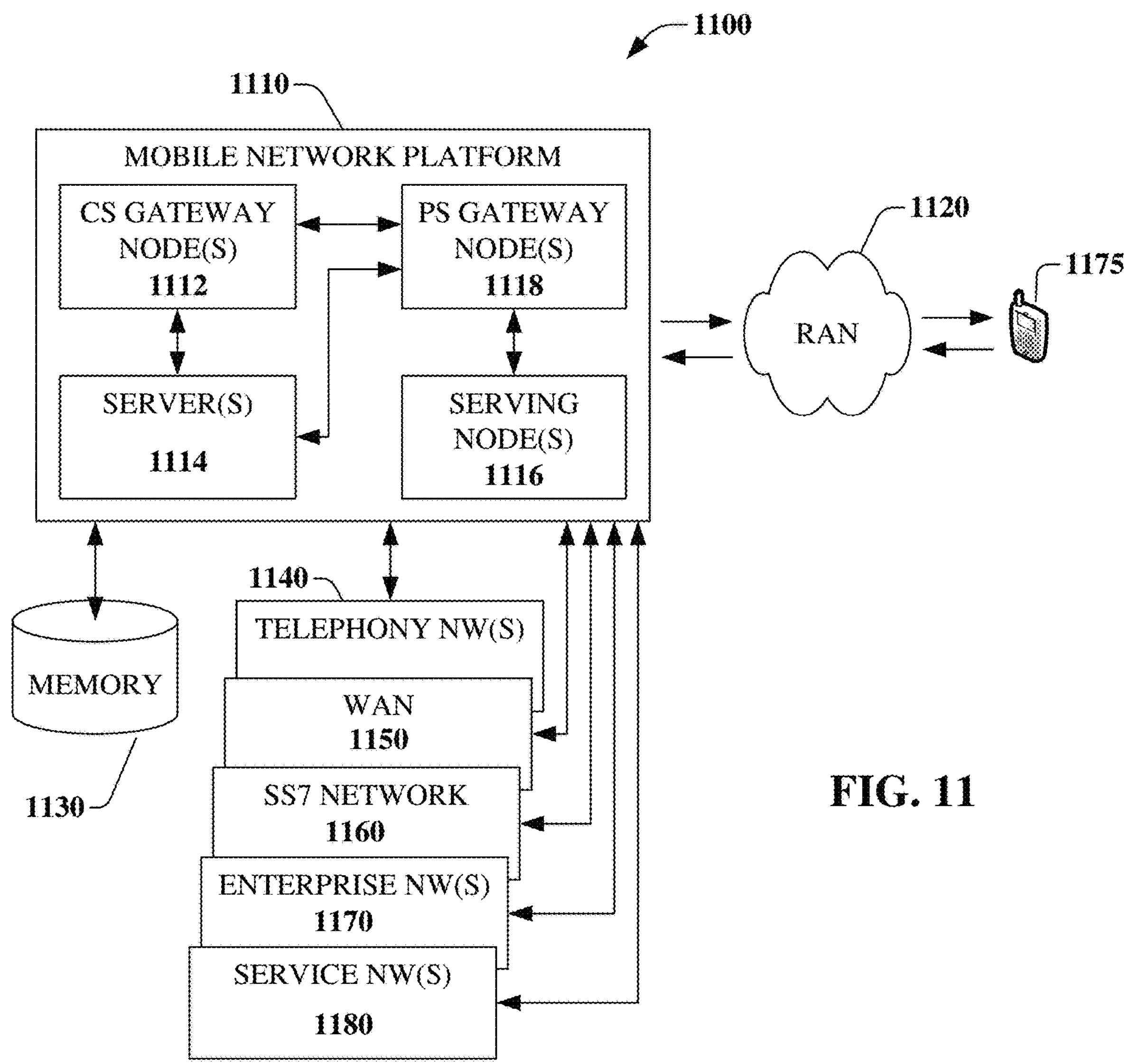
FIG. 11 is a block diagram of an example, non-limiting embodiment of a mobile network platform in accordance with various aspects described herein.

Turning now to FIG. 11, an embodiment 1100 of a mobile network platform 1110 is shown that is an example of network elements 150, 152, 154, 156, and/or VNEs 930, 932, 934, etc. For example, platform 1110 can facilitate in whole or in part conducting location change detection within a radio access network rather than in its associated core network, sending location change notifications to inform entities on the core network side of location changes detected on the RAN side, and/or directing such location change notifications to appropriate location services entities in order to fulfill requests received from associated location services clients. In one or more embodiments, the mobile network platform 1110 can generate and receive signals transmitted and received by base stations or access points such as base station or access point 122. Generally, mobile network platform 1110 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 1110 can be included in telecommunications carrier networks, and can be considered carrier-side components as discussed elsewhere herein. Mobile network platform 1110 comprises CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1160. CS gateway node (s) 1112 can authorize and authenticate traffic (e.g., voice) arising from such networks. Additionally, CS gateway node (s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology (ies) utilized by mobile network platform 1110 for telecommunication over a radio access network 1120 with other devices, such as a radiotelephone 1175.

In addition to receiving and processing CS-switched traffic and signaling, PS gateway node(s) 1118 can authorize and authenticate PS-based data sessions with served mobile devices. Data sessions can comprise traffic, or content(s), exchanged with networks external to the mobile network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s) or radio access network 1120, PS gateway node(s) 1118 can generate packet data protocol contexts when a data session is established; other data structures that facilitate routing of packetized data also can be generated. To that end, in an aspect, PS gateway node(s) 1118 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, mobile network platform 1110 also comprises serving node(s) 1116 that, based upon available radio technology layer(s) within technology resource(s) in the radio access network 1120, convey the various packetized flows of data streams received through PS gateway node(s) 1118. It is to be noted that for technology resource(s) that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in mobile network platform 1110 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to mobile network platform 1110 (e.g., deployed and operated by the same service provider), such as the distributed antennas networks shown in FIG. 1(*s*) that enhance wireless service coverage by providing more network coverage.

It is to be noted that server(s) 1114 can comprise one or more processors configured to confer at least in part the functionality of mobile network platform 1110. To that end, the one or more processor can execute code instructions stored in memory 1130, for example. It is should be appreciated that server(s) 1114 can comprise a content manager, which operates in substantially the same manner as described hereinbefore.

In example embodiment 1100, memory 1130 can store information related to operation of mobile network platform

1110. Other operational information can comprise provisioning information of mobile devices served through mobile network platform 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, SS7 network 1160, or enterprise network(s) 1170. In an aspect, memory 1130 can be, for example, accessed as part of a data store component or as a remotely connected memory store.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 12:
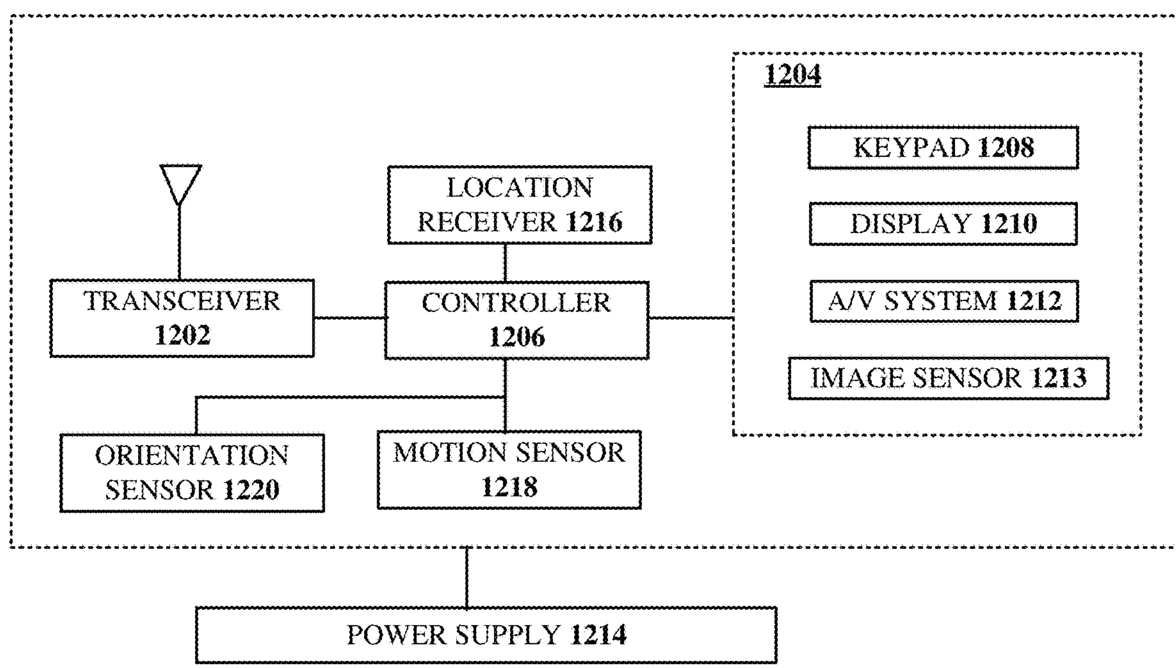
FIG. 12 is a block diagram of an example, non-limiting embodiment of a communication device in accordance with various aspects described herein.

Turning now to FIG. 12, an illustrative embodiment of a communication device 1200 is shown. The communication device 1200 can serve as an illustrative embodiment of devices such as data terminals 114, mobile devices 124, vehicle 126, display devices 144 or other client devices for communication via either communications network 125. For example, computing device 1200 can facilitate in whole or in part conducting location change detection within a radio access network rather than in its associated core network, sending location change notifications to inform entities on the core network side of location changes detected on the RAN side, and/or directing such location change notifications to appropriate location services entities in order to fulfill requests received from associated location services clients.

The communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface having graphical user interface (GUI) elements that can be selected by a user with a touch of a finger. The display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable communications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system for a radio access network (RAN) node, the processing system including a processor; and a memory that stores executable instructions that, when executed by the processing system, facilitate performance of operations, the operations comprising:

identifying, by the RAN node, without first receiving uplink positioning information from a wireless communication device and without first receiving a request from a Location Management Function (LMF) equipment of a communication system for notifications of changes in geographic location of the wireless communication device, positioning information associated with the wireless communication device, wherein the positioning information comprises at least one measured time-based attribute of an uplink wireless signal communicated from the wireless communication device and measured by the RAN node to obtain at least one measured time-based attribute, the at least one measured time-based attribute indicating one of a signal time of arrival, a time of flight, or any combination thereof, the LMF equipment being of a location management entity of a core network of a communication system;

determining, by the RAN node, without first receiving the uplink positioning information from the wireless communication device, and without first receiving the request for notifications of changes in geographic location of the wireless communication device, a current geographic location of the wireless communication device and a current radio sector containing the wireless communication device based on the at least one measured time-based attribute of the uplink wireless signal communicated from the wireless communication device;

detecting, by the RAN node, without first receiving the uplink positioning information from the wireless communication device, and without first receiving the request for notifications of changes in geographic location of the wireless communication device, a change in the current radio sector based on a change in e geographic location of the wireless communication device according to a change in the at least one measured time-based attribute of the uplink wireless signal; and responsive to the detection of the change in the current radio sector based on the change in the at least one measured time-based attribute of the uplink wireless signal, without first receiving the uplink positioning information from the wireless communication device, and without first receiving the request for notifications of changes in the geographic location of the wireless communication device;

determining a specific geo-coded address of the wireless communication device; and sending, by the RAN node, a location change notification to the LMF equipment of the location management entity of a core network of a communication system, wherein the location change notification indicates the current radio sector, the current geographic location of the wireless communication device and the specific geo-coded address of the wireless communication device, wherein the location change notification notifies the location management entity of the core network of the detection of a geographic location change of the wireless communication device, without first receiving the uplink positioning information from the wireless communication device and without first receiving the request for notifications of changes in geographic location of the wireless communication device, and wherein the sending of the location change notification to the LMF equipment causes the LMF equipment to identify a Location Retrieval Function (LRF) applicable to the wireless communication device and causes the LMF equipment to send the location change notification to a location services client associated with the LRF via a Gateway Mobile Location Center (GMLC).

2. The device of claim 1, wherein the positioning information includes a plurality of downlink (DL) positioning measurements and wherein the determining the current radio sector not being based on a position estimate of the wireless communication device.

3. The device of claim 1, wherein the location services client is located outside the core network.

4. The device of claim 1, wherein the uplink positioning information comprises global positioning system (GPS) coordinates.

5. The device of claim 1, wherein the radio access network node serves a cell of a next generation RAN (NG-RAN).

6. The device of claim 5, wherein the RAN node comprises a next generation eNodeB (NG-eNB) or a gNodeB (gNB).

7. The device of claim 1, wherein the uplink positioning information includes a plurality of downlink (DL) positioning measurements, and wherein the detecting the change in the current radio sector is performed without first receiving uplink positioning information from the wireless communication device.

8. A non-transitory machine-readable medium, comprising executable instructions that, when executed by a processing system for a radio access network (RAN) node, the processing system including a processor, facilitate performance of operations, the operations comprising:

identifying, by the RAN node, without first receiving uplink positioning information from a wireless communication device and without first receiving a request from a Location Management Function (LMF) equipment of a communication system for notifications of changes in geographic location of the wireless communication device, positioning information associated with the wireless communication device, wherein the positioning information comprises at least one measured time-based attribute of an uplink wireless signal communicated from the wireless communication device and measured by the RAN node to obtain at least one measured time-based attribute, wherein the at least one measured time-based attribute comprises an indicator of one of a signal time of arrival, a time of flight, or any combination thereof;

determining, by the RAN node, without first receiving uplink positioning information from the wireless communication device, and without first receiving the request for notifications of changes in geographic location of the wireless communication device, a current geographic location of the wireless communication device and a current radio sector containing the wireless communication device based on the at least one measured time-based attribute of the uplink wireless signal communicated from the wireless communication device;

detecting, by the RAN node, without first receiving the uplink positioning information from the wireless communication device, and without first receiving the request for notifications of changes in geographic location of the wireless communication device, a change in the current radio sector based on a change in the geographic location of the wireless communication device according to a change in the at least one measured time-based attribute of the uplink wireless signal; and responsive to the detection of the change in the current radio sector based on the change in the at least one measured time-based attribute of the uplink wireless signal, without first receiving the uplink positioning information from the wireless communication device, and without first receiving the request for notifications of changes in geographic location of the wireless communication device:

determining a specific geo-coded address of the wireless communication device; and sending, by the RAN node, a location change notification to the LMF equipment, wherein the location change notification indicates the current radio sector, the current geographic location of the wireless communication device and the specific geo-coded address of the wireless communication device, and wherein the location change notification notifies a location management entity of the detection of a geographic location change of the wireless communication device, without first receiving the uplink positioning information from the wireless communication device and without first receiving the request for notifications of changes in geographic location of the wireless communication device.

9. The non-transitory machine-readable medium of claim 8, wherein the uplink positioning information includes a plurality of downlink (DL) positioning measurements, and wherein the sending of the location change notification to the LMF equipment causes the LMF equipment to identify a Location Retrieval Function (LRF) applicable to the wireless communication device and causes the LMF equipment to send the location change notification to a location services client associated with the LRF via a Gateway Mobile Location Center (GMLC).

10. The non-transitory machine-readable medium of claim 8, wherein the radio access network node serves a cell of a next generation RAN (NG-RAN).

11. The non-transitory machine-readable medium of claim 10, wherein the RAN node comprises a next generation eNodeB (NG-eNB) or a gNodeB (gNB).

12. The non-transitory machine-readable medium of claim 8, wherein the uplink positioning information includes a plurality of positioning measurements.

13. The non-transitory machine-readable medium of claim 8, wherein the uplink positioning information includes global positioning system (GPS) coordinates provided by the wireless communication device.

14. A method, comprising:

identifying, by a processing system for a radio access network (RAN) node, the processing system including a processor, without first receiving uplink positioning information from a wireless communication device and without first receiving a request from a Location Management Function (LMF) equipment of a communication system for notifications of changes in geographic location of the wireless communication device, positioning information associated with the wireless communication device, wherein the positioning information comprises at least one measured time-based attribute of a wireless signal communicated from the wireless communication device and measured by the RAN node to obtain at least one measured time-based attribute, wherein the at least one measured time-based attribute comprises an indicator of one of a signal time of arrival, a time of flight, or any combination thereof;

determining, by the processing system, without first receiving the uplink positioning information from the wireless communication device, and without first receiving the request for notifications of changes in geographic location of the wireless communication device, a current geographic location of the wireless communication device and a current radio sector containing the wireless communication device based on the at least one measured time-based attribute of the wireless signal communicated from the wireless communication device;

detecting, by the processing system, without first receiving the uplink positioning information from the wireless communication device, and without first receiving the request for notifications of changes in geographic location of the wireless communication device, a change in the current radio sector based on a change in the at least one measured time-based attribute of the wireless signal; and responsive to the detection of the change in the current radio sector based on the change in the at least one measured time-based attribute of the wireless signal, without first receiving the uplink positioning information from the wireless communication device, and without first receiving the request for notifications of changes in geographic location of the wireless communication device:

determining, by the processing system, a specific geo-coded address of the wireless communication device; and sending, by the processing system, a location change notification to the LMF equipment, wherein the location change notification indicates the current radio sector, the current geographic location of the wireless communication device and the specific geo-coded address of the wireless communication device, wherein the location change notification notifies a location management entity of the detection of a geographic location change of the wireless communication device, without first receiving the uplink positioning information from the wireless communication device and without first receiving the request for notifications of changes in geographic location of the wireless communication device.

15. The method of claim 14, wherein the uplink positioning information includes a plurality of downlink (DL) positioning measurements.

16. The method of claim 14, wherein the uplink positioning information includes a plurality of positioning measurements.

17. The method of claim 14, wherein the uplink positioning information includes global positioning system (GPS) coordinates provided by the wireless communication device.

18. The method of claim 14, wherein the RAN node serves a cell of a next generation RAN (NG-RAN), and wherein the sending of the location change notification to the LMF equipment causes the LMF equipment to identify a Location Retrieval Function (LRF) applicable to the wireless communication device and causes the LMF equipment to send the location change notification to a location services client associated with the LRF via a Gateway Mobile Location Center (GMLC).

19. The method of claim 14, wherein the RAN node comprises a next generation eNodeB (NG-eNB).

20. The method of claim 14, wherein the RAN node comprises a gNodeB (gNB).

* * * * *